United States Patent
Davila-Rodriguez et al.

(10) Patent No.: US 12,353,001 B2
(45) Date of Patent: Jul. 8, 2025

(54) FIBER NOISE CANCELLATION

(71) Applicant: Stable Laser Systems, Inc., Boulder, CO (US)

(72) Inventors: Josue Davila-Rodriguez, Boulder, CO (US); William David Lee, Boulder, CO (US)

(73) Assignee: Stable Laser Systems, Inc., Boulder, CO (US)

(*) Notice: Subject to any disclaimer, the term of this patent is extended or adjusted under 35 U.S.C. 154(b) by 227 days.

(21) Appl. No.: 18/186,361

(22) Filed: Mar. 20, 2023

(65) Prior Publication Data

US 2023/0350130 A1     Nov. 2, 2023

Related U.S. Application Data

(60) Provisional application No. 63/335,364, filed on Apr. 27, 2022.

(51) Int. Cl.
    *G02B 6/02*     (2006.01)
    *G01B 9/02001*     (2022.01)
    (Continued)

(52) U.S. Cl.
    CPC ..... *G02B 6/02171* (2013.01); *G01B 9/02004* (2013.01); *G01B 9/02008* (2013.01); *H01S 3/1307* (2013.01); *G02F 1/11* (2013.01)

(58) Field of Classification Search
    CPC ............ G02B 6/02171; G01B 9/02004; G01B 9/02008; G02F 1/11; H01S 3/1307
    See application file for complete search history.

(56) References Cited

U.S. PATENT DOCUMENTS

| | | | |
|---|---|---|---|
| 8,780,948 B2* | 7/2014 | Wilkinson | H01S 3/13 372/18 |
| 10,454,238 B2* | 10/2019 | Fermann | H01S 3/1307 |

(Continued)

FOREIGN PATENT DOCUMENTS

| | | | |
|---|---|---|---|
| EP | 2927636 A1 * | 10/2015 | G01C 19/727 |
| TW | 200522556 | 7/2005 | |

OTHER PUBLICATIONS

Boudot et al. (2020) "Enhanced observation time of magneto-optical traps using micro-machined non-evaporable getter pumps." Scientific Reports 10, No. 1: 1-8.

(Continued)

*Primary Examiner* — Daniel Petkovsek
(74) *Attorney, Agent, or Firm* — LEYDIG VOIT & MAYER, LTD.

(57) ABSTRACT

A system and method for delivering stable light to a remote location are provided. The method includes splitting a laser beam generated by a laser into a reference beam and a delivery beam. The delivery beam is coupled into an optical fiber for delivery to the remote location. A reflected portion of the delivery beam comes back as a reflected delivery beam from the remote location through the optical fiber. An interference beam is generated by combining the reference beam and the reflected delivery beam. A phase difference between the reference beam and the reflected delivery beam is detected in order to adjust a phase of the laser beam based on the phase difference to reverse a phase shift of the delivery beam induced by noise added to the delivery beam while the delivery beam is transmitted through the optical fiber.

20 Claims, 8 Drawing Sheets

(51) Int. Cl.
    *G01B 9/02004*     (2022.01)
    *H01S 3/13*     (2006.01)
    *G02F 1/11*     (2006.01)

(56) References Cited

U.S. PATENT DOCUMENTS

| | | |
|---|---|---|
| 2010/0054288 A1 | 3/2010 | He |
| 2014/0044142 A1 | 2/2014 | Strandjord |
| 2017/0187161 A1 | 6/2017 | Fermann et al. |
| 2023/0253753 A1* | 8/2023 | Davila-Rodriguez .................... H01S 3/137 372/26 |
| 2023/0350130 A1 | 11/2023 | Davila-Rodriguez et al. |

OTHER PUBLICATIONS

Foreman et al. (2007) "Remote transfer of ultrastable frequency references via fiber networks." Review of Scientific Instruments 78, No. 2: 021101.

Grosche (2014) "Eavesdropping time and frequency: phase noise cancellation along a time-varying path, such as an optical fiber," Opt. Lett. 39, 2545-2548.

Ma et al. (1994) "Delivering the same optical frequency at two places: accurate cancellation of phase noise introduced by an optical fiber or other time-varying path." Optics letters 19, No. 21: 1777-1779.

Zhadnov et al. (Oct. 2021) "Long 48-cm ULE cavities in vertical and horizontal orientations for Sr optical clock." Applied Optics 60, No. 29: 9151-9159.

International Search Report and Written Opinion mailed Feb. 2, 2024 in Int'l Application No. PCT/US2023/064689.

\* cited by examiner

FIBER NOISE CANCELLATION

CROSS-REFERENCE TO RELATED APPLICATIONS

This patent application claims the benefit of and priority to U.S. Provisional Patent Application No. 63/335,364, filed Apr. 27, 2022, which is incorporated by reference.

BACKGROUND OF THE INVENTION

In certain applications, generation of stable light may be physically separated from a use of the generated stable light. Indeed, generation of stable light is typically done by locking to an ultra-stable cavity typically located in a very quiet laboratory. By way of example, a non-exhaustive list of applications using this stable light may include atomic clocks, ultra-low noise microwave generation, timing distribution, and interrogation of long submarine fibers for earthquake sensing. As such, the stable light needs to get from the stable cavity to the application location. This is typically achieved via one or more optical fibers and/or free-space paths.

BRIEF SUMMARY OF THE INVENTION

Embodiments of the disclosure provide a method of delivering stable laser light to a remote location via an optical fiber. The method includes: splitting a laser beam generated by a laser into a reference beam and a delivery beam; coupling the delivery beam into the optical fiber for delivering the delivery beam to the remote location, a fraction of the delivery beam being reflected back as a reflected delivery beam from the remote location through the optical fiber; shifting a frequency of the reference beam by a predetermined frequency interval; generating an interference beam by combining the reference beam that has been frequency-shifted and the reflected delivery beam; detecting the interference beam to determine a phase difference between the reference beam and the reflected delivery beam due to noise added to the delivery beam while the delivery beam is transmitted through the optical fiber; and adjusting, via an offset cavity-lock that is coupled to the laser and a reference cavity, a phase of the laser beam based on the phase difference to reverse a phase shift of the delivery beam induced by the noise added to the delivery beam while the delivery beam is transmitted through the optical fiber.

Further embodiments of the disclosure provide a system for delivering stable laser light to a remote location via an optical fiber. The system includes: an optical beam splitter/combiner configured to split a laser beam generated by a laser into a reference beam and a delivery beam, the delivery beam being coupled into an optical fiber for delivering the delivery beam to the remote location, a fraction of the delivery beam being reflected back from the remote location toward the optical beam splitter/combiner through the optical fiber; an acousto-optic modulator (AOM) configured to shift a frequency of the reference beam by a predetermined frequency interval, wherein the optical beam splitter/combiner is further configured to combine the reference beam that has been frequency-shifted and the reflected delivery beam to generate an interference beam; a photodetector configured to detect the interference beam to determine a phase difference between the reference beam and the reflected delivery beam due to noise added to the delivery beam while being transmitted through the optical fiber; and an offset cavity-lock coupled to the laser and a reference cavity, the offset cavity-lock configured to adjust a phase of the laser beam generated by the laser based on the phase difference to reverse a phase shift of the delivery beam induced by the noise added to the delivery beam while being transmitted through the optical fiber.

Yet further embodiments of the disclosure provide a method of delivering stable laser light to a remote location via an optical fiber. The method includes: splitting a laser beam generated by a first laser into a reference beam and a delivery beam; coupling the delivery beam into the optical fiber for delivering the delivery beam to the remote location, a fraction of the delivery beam being reflected back from the remote location through the optical fiber; shifting a frequency of the reference beam by a predetermined frequency interval; generating an interference beam by combining the reference beam that has been frequency-shifted and the reflected delivery beam; detecting the interference beam to determine a phase difference between the reference beam and the reflected delivery beam due to noise added to the delivery beam while the delivery beam is transmitted through the optical fiber; and adjusting, via a phase-locked loop coupled to the first laser and a second laser, a phase of the laser beam based on the phase difference by locking the phase of the laser beam generated by the first laser to a phase of a stable laser beam generated by the second laser, thereby delivering a corrected laser beam to the remote location free of the noise acquired while being transmitted through the optical fiber.

Even further embodiments of the disclosure provide a system for delivering stable laser light to a remote location via an optical fiber. The system includes: an optical beam splitter/combiner configured to split a laser beam generated by a first laser into a reference beam and a delivery beam, the delivery beam being coupled into the optical fiber for delivering the delivery beam to the remote location, a fraction of the delivery beam being reflected back from the remote location toward the optical beam splitter/combiner through the optical fiber; an acousto-optic modulator (AOM) configured to shift a frequency of the reference beam by a predetermined frequency interval, wherein the optical beam splitter/combiner is further configured to combine the reference beam that has been frequency-shifted and the reflected delivery beam to generate an interference beam; a photodetector configured to detect the interference beam to determine a phase difference between the reference beam and the reflected delivery beam due to noise added to the delivery beam while being transmitted through the optical fiber; and a phase-locked loop coupled to the first laser and a second laser, the phase-locked loop being configured to adjust a phase of the laser beam generated by the first laser based on the phase difference by locking the phase of the laser beam to a phase of a stable laser beam generated by the second laser, thereby delivering the delivery beam to the remote location free of the noise acquired while being transmitted through the optical fiber.

BRIEF DESCRIPTION OF THE SEVERAL VIEWS OF THE DRAWING(S)

DETAILED DESCRIPTION OF THE INVENTION

In certain applications, generation of stable light may be physically separated from a use of the generated stable light. Indeed, generation of stable light is typically done by locking to an ultra-stable cavity typically located in a very quiet laboratory. Applications using this stable light include atomic clocks, ultra-low noise microwave generation, timing distribution, and interrogation of long submarine fibers for earthquake sensing are a few of such applications. As such, the stable light needs to get from the stable cavity to the application location. This is typically achieved via one or more optical fibers.

Optical fibers are sensitive to environmental changes such as acoustic vibrations and thermal fluctuations (the glass in the fiber couples the temperature changes to length through both thermal expansion and thermal changes of the refractive index). These environmental changes cause noise to get written into the phase of the stable light, thereby degrading its stability. For example, with fiber lengths greater than 1 or 2 meters, light is generally degraded so it no longer has stability at the df/f of approximately 1e-15 level.

Figure 1:
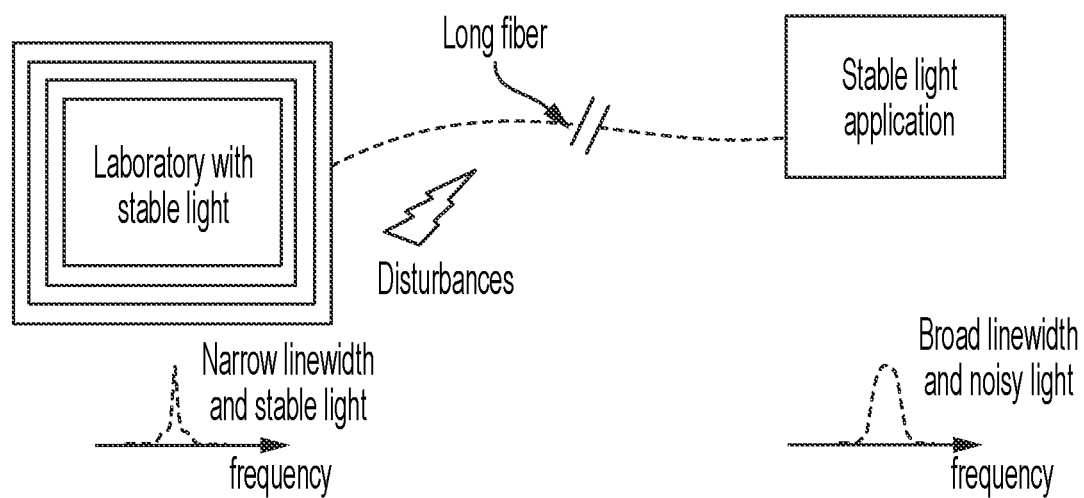
FIG. 1 illustrates noisy transmission of stable light.

FIG. 1 illustrates a typical transmission of stable light over a noisy optical fiber. As illustrated, a narrow linewidth and stable light is generated in a laboratory. The stable light is transmitted over a long optical fiber, over which disturbances are introduced affecting the light as it propagates through the optical fiber. The result of the noise is the broad linewidth and noisy light obtained at an application end using the stable light.

Figure 2:
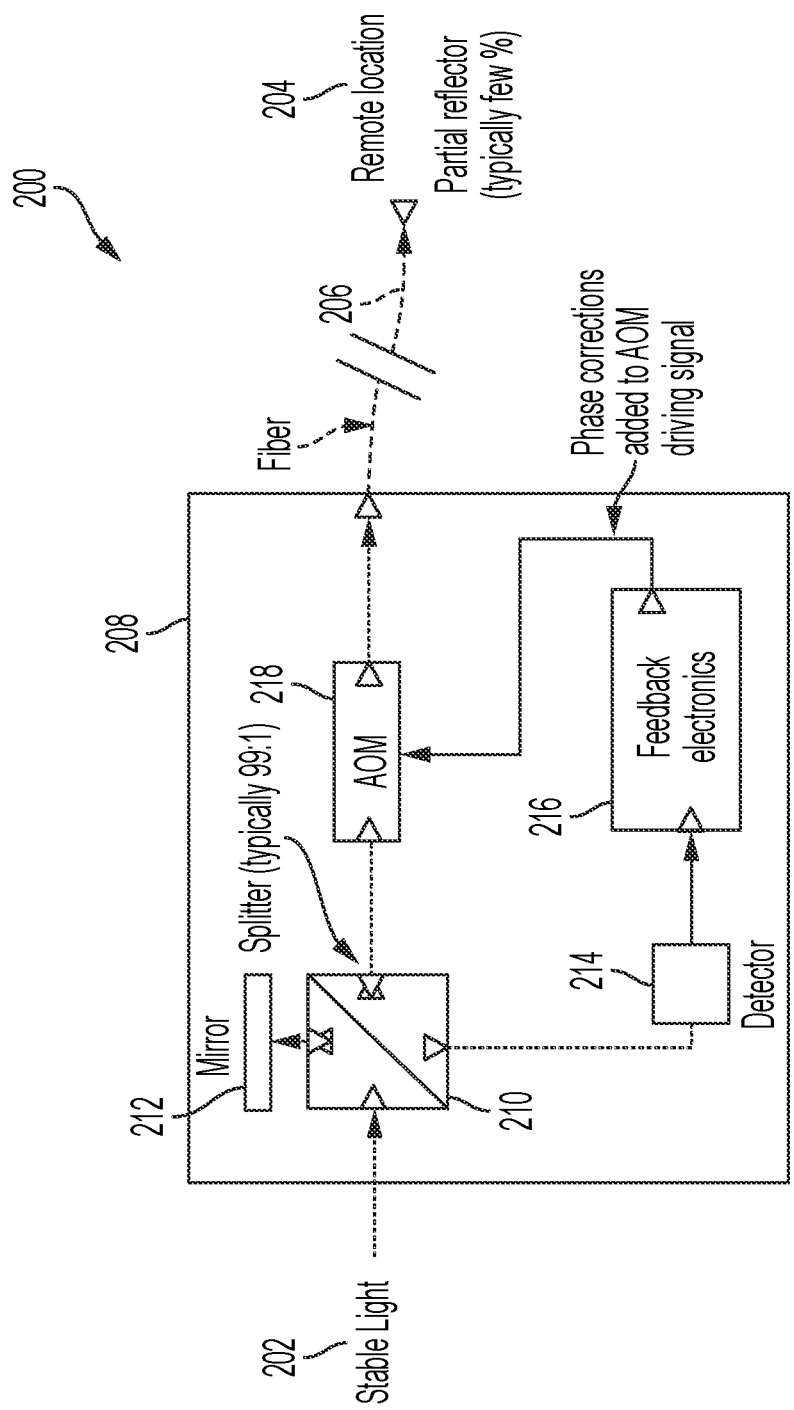
FIG. 2 illustrates a prior art fiber noise cancellation system.

FIG. 2 illustrates a prior art fiber noise cancellation system 200 including a reference arm and a remote arm. The reference arm of the fiber noise cancellation system 200 provides stable light 202 to a remote arm at a remote location 204 over optical fiber 206. As discussed in relation to FIG. 1, noise is typically introduced over the optical fiber 206 such that the stable light 202 is noisy when it reaches the remote location 204. In this prior art fiber noise cancellation system 200, a Michelson/self-heterodyne interferometer 208 is provided to compensate for the noise.

The Michelson/self-heterodyne interferometer 208 includes a splitter/combiner 210, a mirror 212, a detector 214, feedback electronics 216, and an acousto-optic modulator (AOM) 218. The Michelson/self-heterodyne interferometer 208 functions to compensate for the noise in four main steps. First, the stable light 202 is split at splitter/combiner 210 into a reference beam and a delivery beam. The reference beam is used for phase comparison and generated by bouncing light off mirror 212, with the reference beam generation section of interferometer 208 being isolated from any acoustic or temperature effects to prevent introduction of noise into the reference beam.

The second step is shifting the delivery beam by a fixed frequency (e.g., 80 MHz) using the AOM 218 before transmitting through optical fiber 206. Once the delivery beam reaches the remote location 204, a portion is reflected back to the splitter/combiner 210 in the form of a reflected delivery beam.

The third step includes the splitter/combiner 210 combining the reflected delivery beam and the reference beam to generate an interference beam. This interference beam is detected by the detector 214 and has encoded in it the phase difference between the reference arm and the remote arm due to the reflected delivery beam include phase error introduced via noise over the optical fiber 206.

In the fourth step, the feedback electronics 216 uses the phase difference in the interference beam to apply a correction to the AOM 218. In certain embodiments, this correction is performed by writing the negative of the measured phase difference to the delivery beam via the AOM 218 in order to compensate for the phase shift due to noise in the fiber 206. In other embodiments, such as the illustrated closed loop embodiment, this correction is performed by having the feedback electronics apply a correction until the error signal goes to zero. Using either embodiment, this makes the delivery beam delivered to the application virtually free of noise added in the transmission through fiber 206.

The prior art system of FIG. 2 has the major drawback that the AOM 218 is a lossy element. This will negatively affect the power of the delivery beam and reduce a number of applications where the system of FIG. 2 may be effectively utilized. Adding an optical amplifier will result in increased cost and complexity, and suitable amplifiers may not be available in all wavelength ranges.

Figure 3:
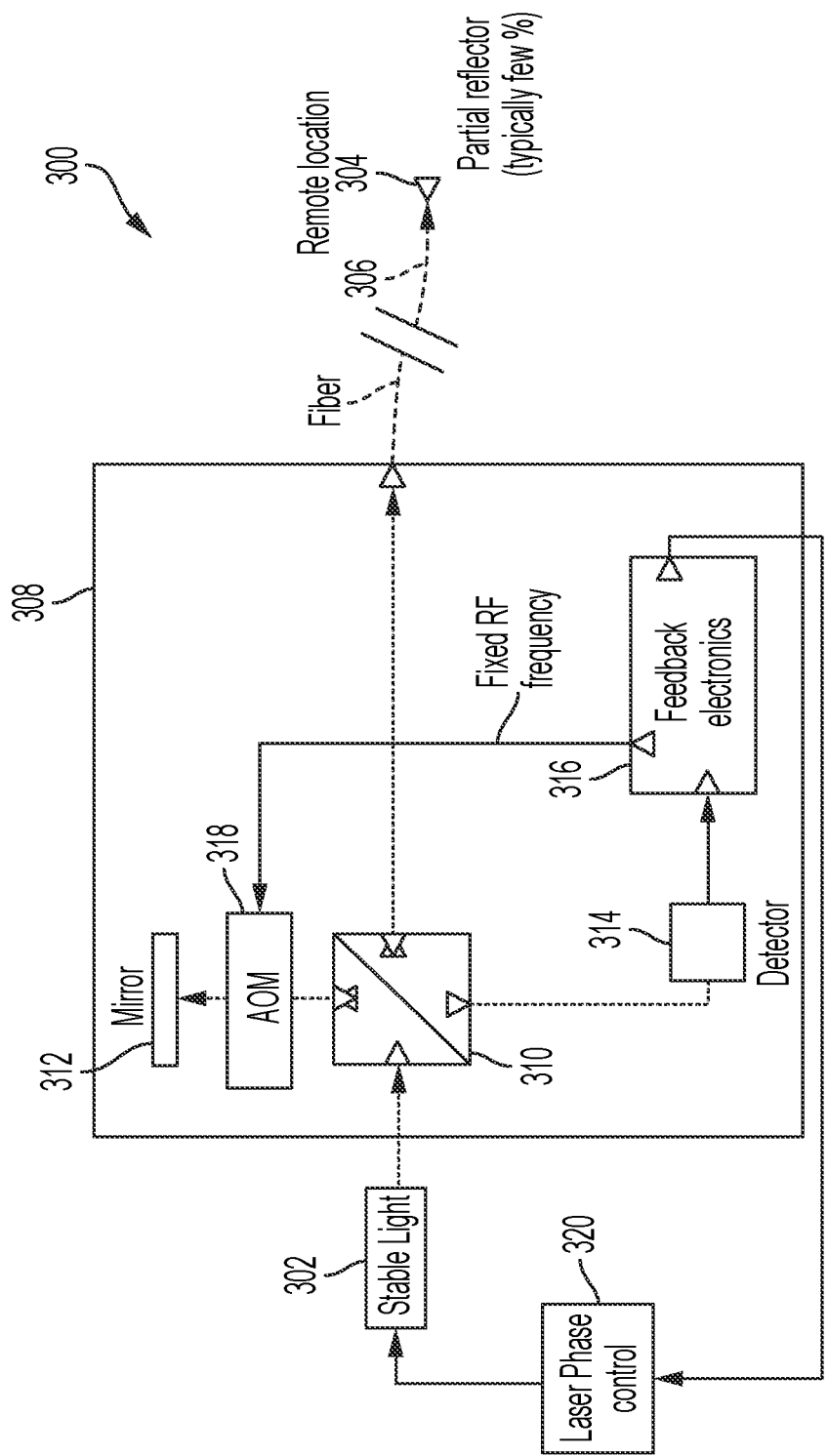
FIG. 3 illustrates a fiber noise cancellation system, in accordance with an embodiment of the disclosure.

FIG. 3 illustrates an embodiment of the disclosure providing a system 300 for fiber noise cancellation. The fiber noise cancellation system 300 includes a reference arm and a remote arm. The reference arm of the fiber noise cancellation system 300 provides stable light from the source laser 302 to a remote arm at a remote location 304 over optical fiber 306. As discussed in relation to FIG. 1, noise is typically introduced over the optical fiber 306 such that the stable light from laser 302 is noisy when it reaches the remote location 304. In fiber noise cancellation system 300, a modified Michelson/self-heterodyne interferometer 308 is provided to compensate for the noise.

The modified Michelson/self-heterodyne interferometer 308 includes a splitter/combiner 310, a mirror 312, a detector 314, feedback electronics 316, and an acousto-optic modulator (AOM) 318. The Michelson/self-heterodyne interferometer 308 functions to compensate for the noise in four main steps.

First, the stable light 302 is split at splitter/combiner 310 into a reference beam and a delivery beam. The reference beam is used for phase comparison and is generated by bouncing light off mirror 312, with the reference beam generation section of interferometer 308 being isolated from any acoustic or temperature effects to prevent introduction of noise into the reference beam. The reference beam is shifted in frequency by a fixed frequency (e.g., 80 MHz) using the AOM 318.

In the second step the delivery beam is transmitted through optical fiber 306. In the illustrated embodiment, the AOM 318 is located in the reference beam generation section of interferometer 308. In this manner, loss can be reduced in the delivery beam. Loss from the AOM 318 is not an issue in the reference arm because the minimum necessary power for high fidelity phase detection in a heterodyne setup is quite low (a few uW). At this point, the delivery beam is sent to the remote location 304 over the fiber 306.

Once the delivery beam reaches the remote location 304, a portion is reflected back to the splitter/combiner 310 in the form of a reflected delivery beam.

The third step includes the splitter/combiner 310 combining the reflected delivery beam and the reference beam to generate an interference beam. This interference beam is detected by the detector 314 and has encoded in it the phase difference between the reference arm and the remote arm due to the reflected delivery beam include phase error introduced via noise over the optical fiber 306.

In the fourth step, the feedback electronics 316 uses the phase difference in the interference beam to apply a correction to the laser phase control 320. This correction is used by the laser phase control 320 to subtract the phase difference at the laser 302 in order to compensate for the phase shift due to noise in the fiber 306. In the illustrated embodiment, this is controlled by controlling the phase of the laser 302 where it interacts with a phase lock. In this embodiment, the laser 302 is set up to allow precise control of its phase/frequency. In this regard, the laser phase control 320 may be provided through a phase lock loop or through an offset lock to a cavity. This makes the delivery beam delivered to the application virtually free of noise added in the transmission through fiber 306.

Figure 4:
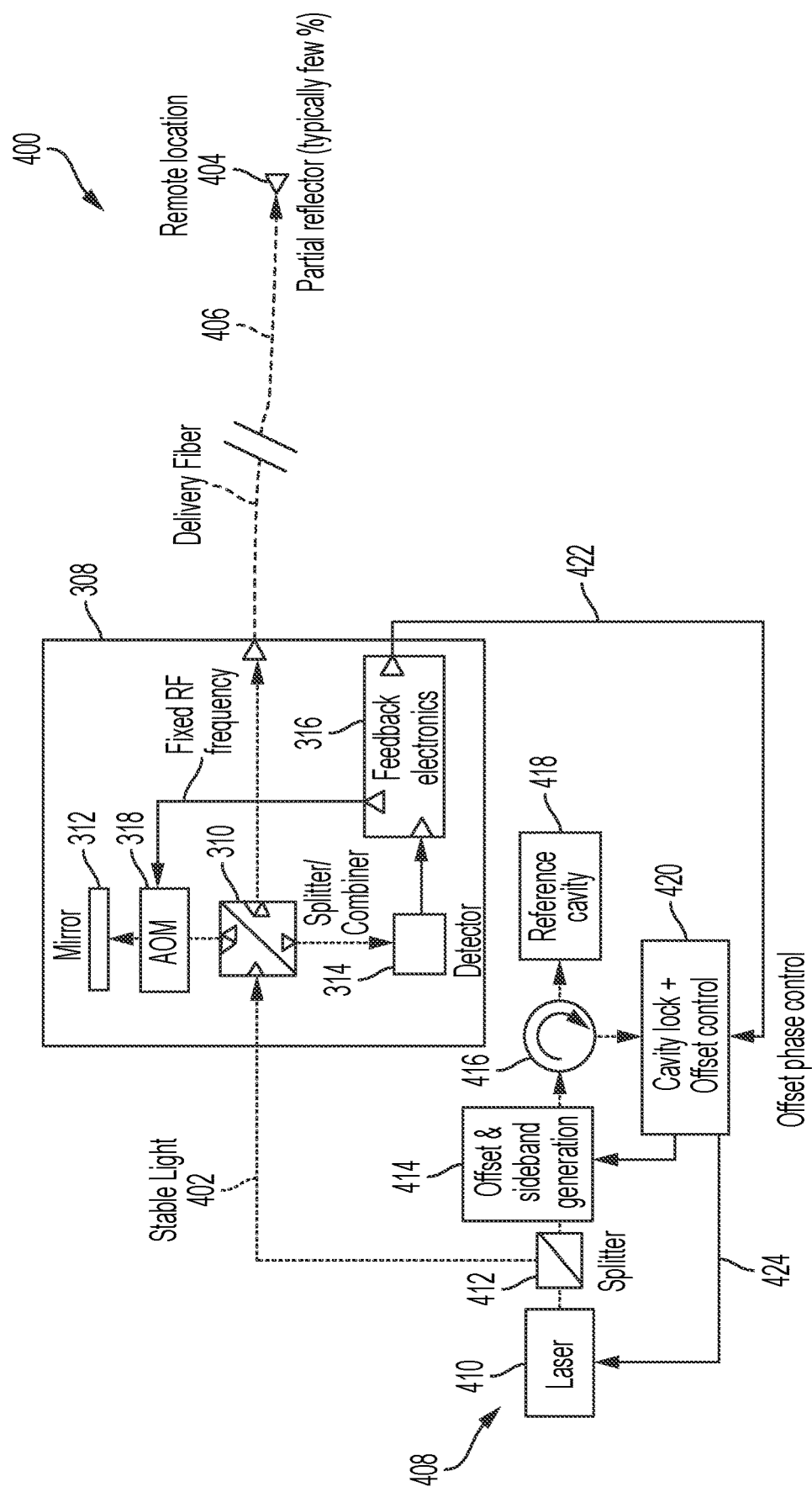
FIG. 4 illustrates a fiber noise cancellation system, in accordance with an embodiment of the disclosure.
Figure 5:
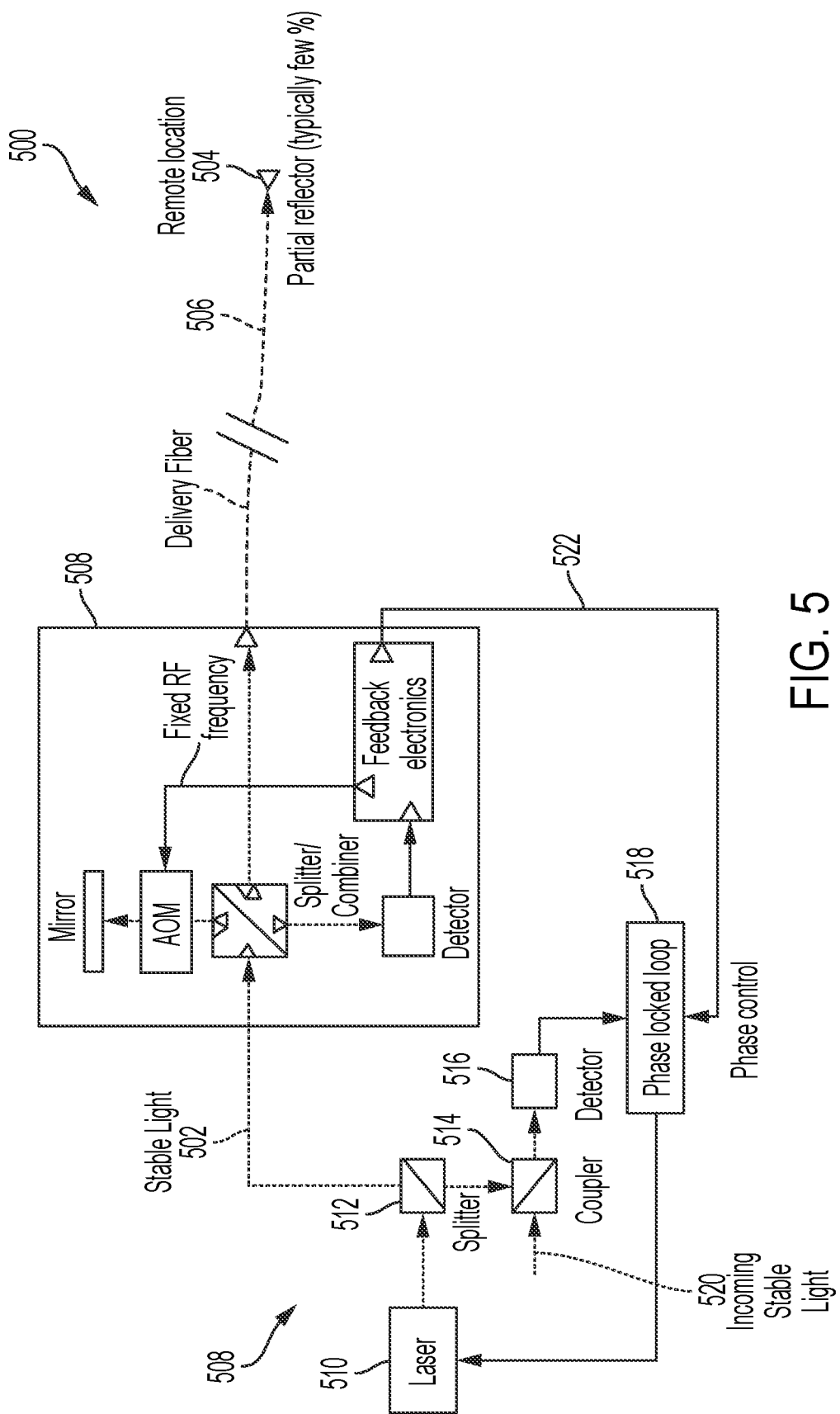
FIG. 5 illustrates a fiber noise cancellation system, in accordance with an embodiment of the disclosure.
Figure 6:
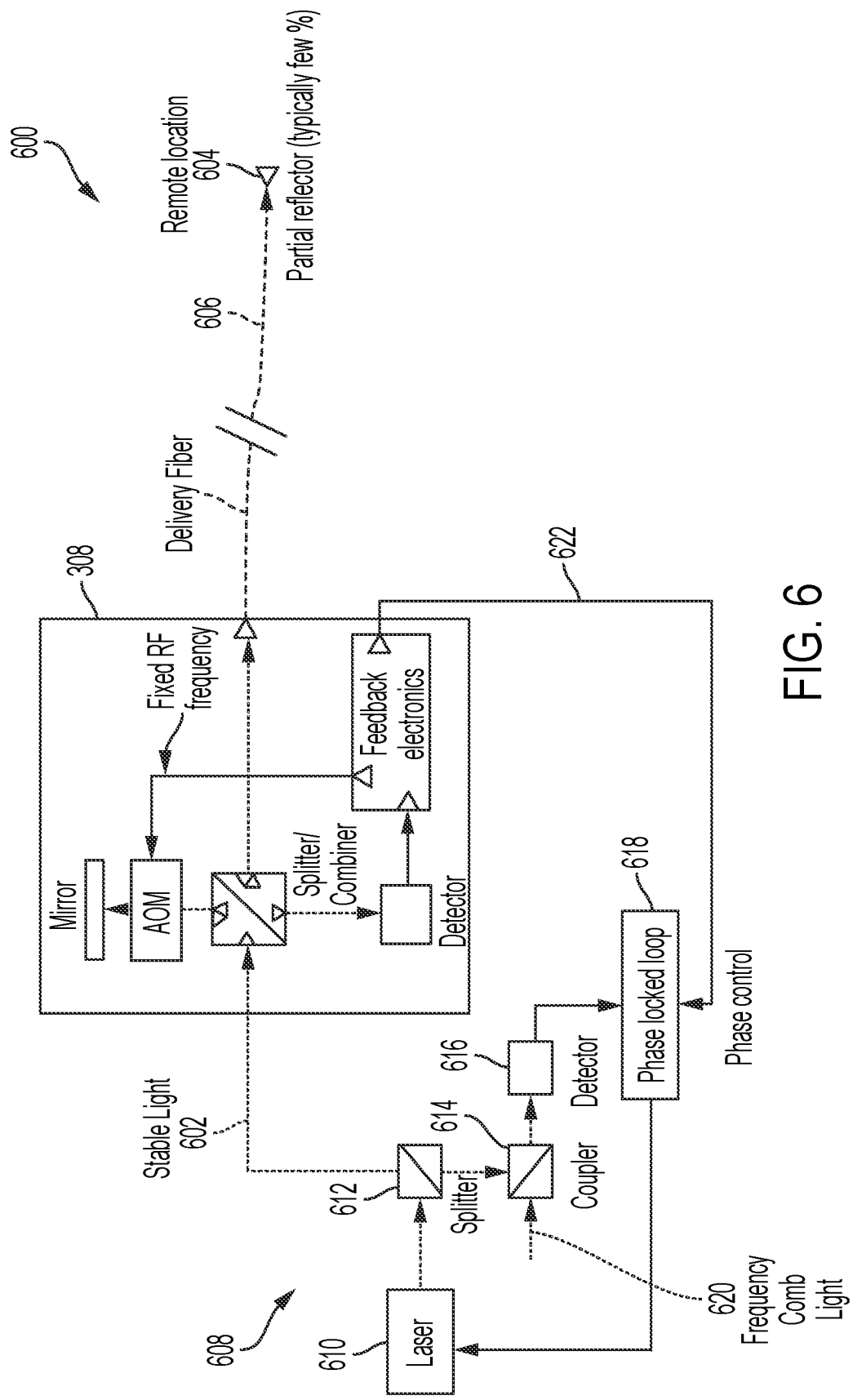
FIG. 6 illustrates a fiber noise cancellation system, in accordance with an embodiment of the disclosure.

FIGS. 4-6 illustrate various embodiments utilizing the modified Michelson/self-heterodyne interferometer 308 with various types of laser phase control, in accordance with embodiments of the disclosure. FIG. 4 illustrates a system 400 for fiber noise cancellation. System 400 includes the modified Michelson/self-heterodyne interferometer 308, which operates as described in relation to FIG. 3. As such, system 400 provides stable light 402 formed into a delivery beam by the modified Michelson/self-heterodyne interferometer 308 for delivery to a remote location 404 via a fiber 406. A reflected delivery beam is returned and provided to the detector 314 by the splitter/combiner 310 in order for the feedback electronics 316 to generate a measured phase error 422. The modified Michelson/self-heterodyne interferometer 308 then provides the measured phase error 422 to a laser phase control system 408.

Figure 7:
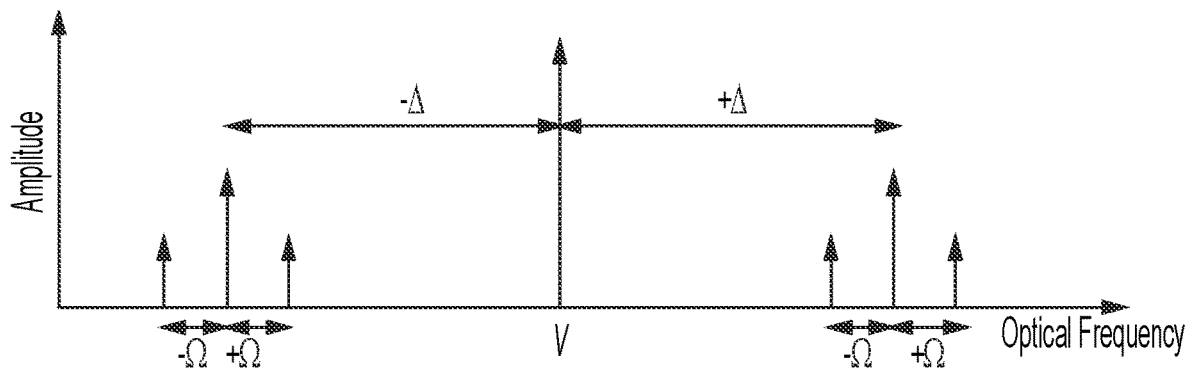
FIG. 7 illustrates a laser frequency with sidebands, in accordance with an embodiment of the disclosure.

The laser phase control system 408 includes a laser 410, a splitter 412, an offset and sideband generator 414, a circulator 416, a reference cavity 418, and a cavity lock and offset controller 420. The laser control system 408 operates to provide the stable light 402. Initially, the laser 410 generates a laser light source that is provided to the splitter 412, which splits the laser light to the modified Michelson/self-heterodyne interferometer 308 for use at the remote location 404 and provides a portion of the laser light to the offset and sideband generator 414 to implement an offset lock on the laser light frequency in conjunction with the reference cavity 418 and cavity lock and offset control 420 with the laser light provided via circulator 416. To implement the offset lock, the laser with frequency $v_{Laser}$ is modulated at offset frequency $\Delta$. This process generates sidebands at $+/-\Delta$ (as illustrated in FIG. 7). The signal at frequency $\Delta$ is itself phase-modulated at frequency $\Omega$. One of these sidebands is then locked to the cavity 316 using the Pound-Drever-Hall method. The Pound-Drever-Hall signal is obtained by demodulating the cavity 316 reflection at $\Omega$. The phase of the cavity locked light is then modified by the cavity lock and offset control 420 to undo the measured phase error 422 generated by the modified Michelson/self-heterodyne interferometer 308. The cavity lock and offset control 420 generates a control signal 424 to control the phase and frequency of the laser 410.

FIG. 5 illustrates a system 500 for fiber noise cancellation. System 500 includes the modified Michelson/self-heterodyne interferometer 308, which operates as described in relation to FIG. 3. As such, system 500 provides stable light 502 formed into a delivery beam by the modified Michelson/self-heterodyne interferometer 308 for delivery to a remote location 504 via a fiber 506. A reflected delivery beam is returned and provided to the detector 314 by the splitter/combiner 310 in order for the feedback electronics 316 to generate measured phase error 522. The modified Michelson/self-heterodyne interferometer 308 then provides the measured phase error 522 to a laser phase control system 508.

The laser phase control system 508 includes a laser 510, a splitter 512, a coupler 514, a photodetector 516, and a phase locked loop (PLL) 518. The laser 510 of the laser phase control system 508 provides a laser beam to the splitter 512, which splits the laser beam with one branch becoming the stable light 502 and the other branch becoming an input into coupler 514. The coupler 514 couples the laser beam from the laser 510 with a second laser beam 520 close in frequency to the laser beam from laser 510. The combined beam is sent to the photodetector 516. The photodetector 516 generates a beat-note and provides the beat-note to the PLL 518. The beat-note is then phase locked. The phase of this PLL 518 is modified by the measured phase error 522. This ultimately changes the phase of laser 510 to ensure stable light delivery at 504. This feedback to laser 510 allows for removing the noise introduced into system 500 via fiber 506. With respect to the two laser beams of system 500, the illustrated method could apply to essentially any two lasers. However, in certain embodiments, the second laser (i.e., laser 520) is stable and the first laser 510 is less stable. By closing the PLL 518, the first laser 510 can be made as stable as laser 520. In comparison to system 400 from FIG. 4, the beat-note frequency plays the same role at $\Delta$ (see FIG. 7) and the phase changes can be applied to it to correct for errors introduced via fiber 506.

FIG. 6 illustrates a system 600 for fiber noise cancellation. System 600 includes the modified Michelson/self-heterodyne interferometer 308, which operates as described in relation to FIG. 3. As such, system 600 provides stable light 602 formed into a delivery beam by the modified Michelson/self-heterodyne interferometer 308 for delivery to a remote location 604 via a fiber 606. A reflected delivery beam is returned and provided to the detector 314 by the splitter/combiner 310 in order for the feedback electronics 316 to generate a measured phase error 622. The modified Michelson/self-heterodyne interferometer 308 then provides the interference beam 622 to a laser phase control system 608.

The laser phase control system 608 includes a laser 610, a splitter 612, a coupler 614, a photodetector 616, and a phase locked loop (PLL) 618. The laser control system 608 functions similarly to the laser control system 508 described above in relation to FIG. 5 but with one exception. That exception is that rather than a second laser producing a second laser beam for coupling with the laser beam from laser 510, laser phase control system 608 couples, at coupler 616, the laser beam from laser 610 with a frequency comb or a frequency comb phase-locked to another continuous wave laser. The combined beam is sent to the photodetector 616. The photodetector 616 generates a beat-note and provides that to the PLL 618. The beat-note is then phase locked. The phase of this phase lock is modified by the measured phase error 622 and fed back to one of the lasers, in the illustrated embodiment it is fed back to the laser 610. This feedback to laser 610 allows for removing the noise introduced into system 600 via fiber 606. In comparison to system 400 from FIG. 4, the beat-note frequency plays the same role at Δ (see FIG. 7) and the phase changes can be applied to it to correct for errors introduced via fiber 606.

Figure 8:
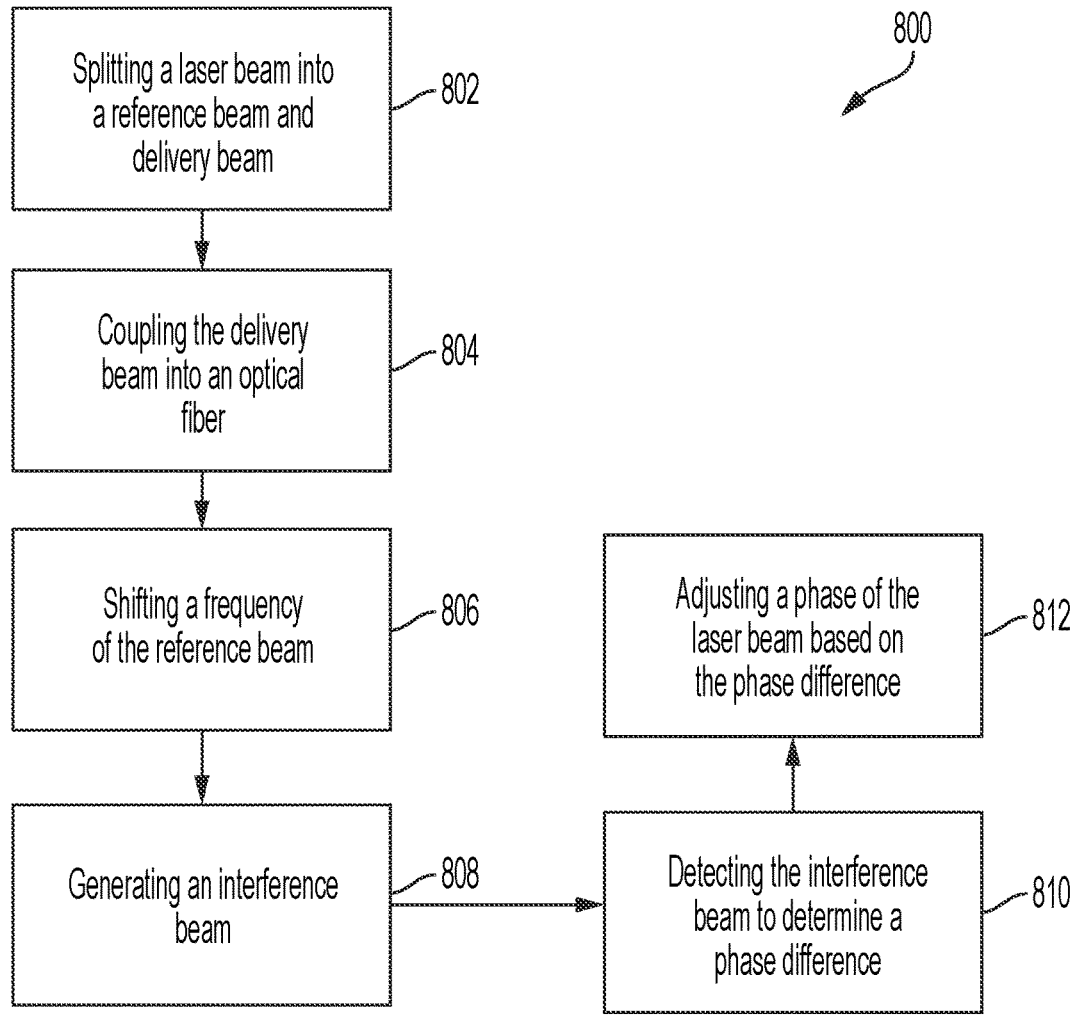
FIG. 8 illustrates a fiber noise cancellation method, in accordance with an embodiment of the disclosure.

FIG. 8 illustrates a method 800 for fiber noise cancellation. In various embodiments, the method 800 may be performed by any one of the fiber noise cancellation systems 300, 400, 500, or 600. Method 800 includes splitting a laser beam into a reference beam and a delivery beam, at step 802. At step 804, the delivery beam is coupled into an optical fiber. At step 806, a frequency of the reference beam is shifted, for example by 80 MHz. At step 808, an interference beam is generated by detecting a portion of the delivery beam reflected from a remote location where the optical fiber took the reference beam. At step 810, the interference beam is detected and a phase of the interference beam is determined. At step 812, the phase of the interference beam is used to adjust a phase of a laser input to the fiber noise cancellation systems 300, 400, 500, or 600 in order to remove noise introduced over the optical fiber.

Figure 9:
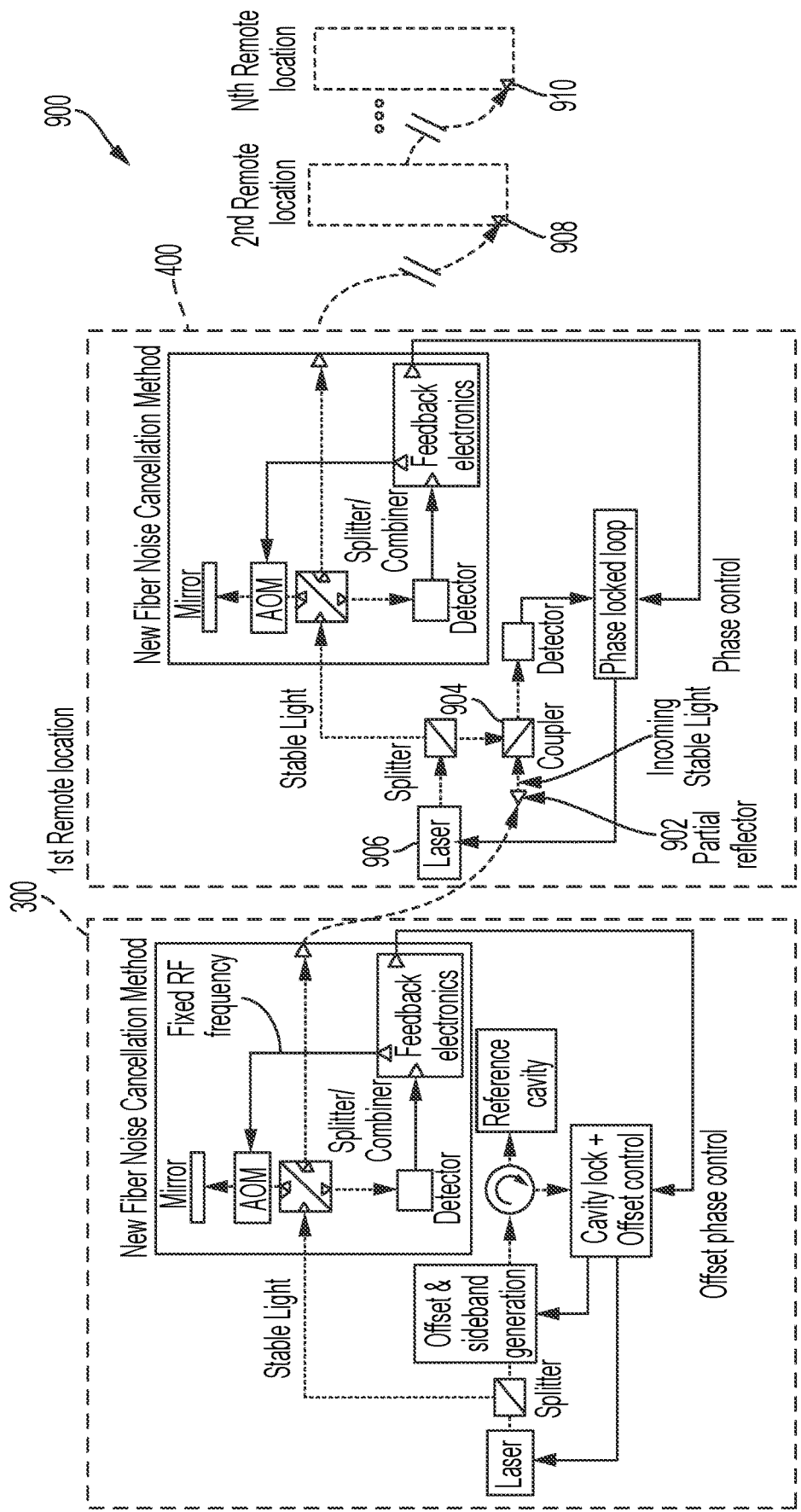
FIG. 9 illustrates a daisy-chain of fiber noise cancellation systems, in accordance with an embodiment of the disclosure.

FIG. 9 illustrates a daisy chain of fiber noise cancellation systems 900. The daisy chain of fiber noise cancellation systems 900 is configured as repeater stations carrying stable light to multiple remote locations in a daisy chain fashion. In the illustrated embodiment, the daisy chain of fiber noise cancellation systems 900 carry stable light to N remote locations. A reference beam is generated by fiber noise cancellation system 300. The method of generating the stable light of the reference beam is described above in relation to FIG. 3 and will not be repeated here for brevity.

The reference beam is transmitted to a first remote location, which, in the illustrated embodiment, is configured as fiber noise cancellation system 400. The reference beam enters fiber noise cancellation system 400 and has a portion reflected by a partial reflector 902. This reflection beam is used as the interference beam at fiber noise cancellation system 300 in order to remove noise introduced over the fiber connection between the fiber noise cancellation system 300 and the first remote location. At the fiber noise cancellation system 400 of the first remote location, the remainder of the reference beam is coupled at coupler 904 with a laser beam from a repeater laser 906. The fiber noise cancellation system 400 in this daisy chain configuration functions substantially similarly to the description of the fiber noise cancellation system 400 described in relation to FIG. 4. The primary difference is that the stable light is provided from a prior fiber noise cancellation system and that stable light is compared against a laser beam from a repeated laser 906. Otherwise, the functionality is the same.

The fiber noise cancellation system 400 of the daisy chain of fiber noise cancellation systems 900 generates a reference beam that is provided as a stable light input into the second remote location, which utilizes the provided stable light to generate its own reference signal that is in turn provided as a stable light input to another remote location. This can be daisy chained to as many remote locations as desired. At each remote location, the associated fiber noise cancellation system includes a partial reflector 908, 910 that reflects a portion of the provided reference beam back to the earlier fiber noise cancellation system in order to be utilized as an interference beam as described above in relation to one of FIGS. 3-6.

The daisy chain of fiber noise cancellation systems 900 in illustrated as having N remote locations and using fiber noise cancellation system 300 to generate a first reference beam and followed by a fiber noise cancellation system 400 at the first remote location to generate the second reference beam for the second remote location. Other embodiments exist where a different configuration of fiber noise cancellation systems is utilized in the daisy chain. Indeed, any combination of one or more of the fiber noise cancellation systems 300, 400, 500, or 600 may be used at the various remote locations of the daisy chain of fiber noise cancellation systems 900.

As an aside, in relation to the fiber noise cancellation systems 300, 400, 500, and 600 from FIGS. 3-6, the interference beam is generated by a reflected portion of the delivery beam. As such, the interference beam experiences the fiber noise twice, once on the way to the remote location and again as it returns to the beamsplitter. As such, in certain embodiments, the measured phase from the interference signal is divided by two before being applied to correct the phase of the laser generating the stable light.

As a further aside, as discussed above, certain embodiments of the fiber noise cancellation systems 300, 400, 600, or 600 utilize a Michelson/self-heterodyne interferometer. However, the use of the Michelson/self-heterodyne interferometer is not required in that any other type of interferometer could be substituted with appropriate design considerations taken into account. For instance, the above described embodiments could be implemented using a Mach-Zehnder interferometer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of delivering stable laser light to a remote location via an optical fiber, the method comprising:
   splitting a laser beam generated by a laser into a reference beam and a delivery beam;
   coupling the delivery beam into the optical fiber for delivering the delivery beam to the remote location, a fraction of the delivery beam being reflected back as a reflected delivery beam from the remote location through the optical fiber;
   shifting a frequency of the reference beam by a predetermined frequency interval;
   generating an interference beam by combining the reference beam that has been frequency-shifted and the reflected delivery beam;
   detecting the interference beam to determine a phase difference between the reference beam and the reflected delivery beam due to noise added to the delivery beam while the delivery beam is transmitted through the optical fiber; and
   adjusting, via an offset cavity-lock that is coupled to the laser and a reference cavity, a phase of the laser beam based on the phase difference to reverse a phase shift of the delivery beam induced by noise added to the delivery beam while the delivery beam is transmitted through the optical fiber.

2. The method of claim 1, wherein splitting the laser beam into the reference beam and the delivery beam is performed using an optical beam splitter/combiner.

3. The method of claim 2, wherein combining the reference beam that has been frequency-shifted and the reflected delivery beam is performed using the optical beam splitter/combiner.

4. The method of claim 1, wherein shifting the frequency of the reference beam is performed using an acousto-optic modulator (AOM).

5. The method of claim 1, wherein detecting the interference beam is performed using a photodetector.

6. The method of claim 1, wherein the offset cavity-lock is further configured to lock a frequency of the laser beam generated by the laser to a frequency of the reference cavity.

7. A system for delivering stable laser light to a remote location via an optical fiber, the system comprising:
   an optical beam splitter/combiner configured to split a laser beam generated by a laser into a reference beam and a delivery beam, the delivery beam being coupled into an optical fiber for delivering the delivery beam to the remote location, a fraction of the delivery beam being reflected back from the remote location toward the optical beam splitter/combiner through the optical fiber;
   an acousto-optic modulator (AOM) configured to shift a frequency of the reference beam by a predetermined frequency interval, wherein the optical beam splitter/combiner is further configured to combine the reference beam that has been frequency-shifted and the reflected delivery beam to generate an interference beam;
   a photodetector configured to detect the interference beam to determine a phase difference between the reference beam and the reflected delivery beam due to noise added to the delivery beam while being transmitted through the optical fiber; and
   an offset cavity-lock coupled to the laser and a reference cavity, the offset cavity-lock configured to adjust a phase of the laser beam generated by the laser based on the phase difference to reverse a phase shift of the delivery beam induced by the noise added to the delivery beam while being transmitted through the optical fiber.

8. The system of claim 7, further comprising a mirror disposed in an optical path of the reference beam, the mirror configured to reflect the reference beam toward the optical beam splitter/combiner, so as to be combined with the reflected delivery beam.

9. The system of claim 7, wherein the offset cavity-lock is further configured to lock a frequency of the laser beam generated by the laser to a frequency of the reference cavity.

10. The system of claim 9, wherein the offset cavity-lock is further coupled to an offset and sideband generation unit, and wherein the offset and sideband generation unit, the cavity lock and offset control unit, and the reference cavity form a servo loop for locking the phase and the frequency of the laser beam to a phase and the frequency of the reference cavity.

11. A method of delivering stable laser light to a remote location via an optical fiber, the method comprising:
   splitting a laser beam generated by a first laser into a reference beam and a delivery beam;
   coupling the delivery beam into the optical fiber for delivering the delivery beam to the remote location, a fraction of the delivery beam being reflected back from the remote location through the optical fiber;
   shifting a frequency of the reference beam by a predetermined frequency interval;
   generating an interference beam by combining the reference beam that has been frequency-shifted and the reflected delivery beam;
   detecting the interference beam to determine a phase difference between the reference beam and the reflected delivery beam due to noise added to the delivery beam while the delivery beam is transmitted through the optical fiber; and
   adjusting, via a phase-locked loop coupled to the first laser and a second laser, a phase of the laser beam based on the phase difference by locking the phase of the laser beam generated by the first laser to a phase of a stable laser beam generated by the second laser, thereby delivering a corrected laser beam to the remote location free of the noise while being transmitted through the optical fiber.

12. The method of claim 11, wherein splitting the laser beam into the reference beam and the delivery beam is performed using an optical beam splitter/combiner.

13. The method of claim 12, wherein combining the reference beam that has been frequency-shifted and the reflected delivery beam is performed using the optical beam splitter/combiner.

14. The method of claim 11, wherein shifting the frequency of the reference beam is performed using an acousto-optic modulator (AOM).

15. The method of claim 11, wherein detecting the interference beam is performed using a photodetector.

16. The method of claim 11, wherein the second laser is a stable laser delivered through a stabilized fiber link, and wherein the method further comprises:
   at the remote location, phase-locking a laser local to the remote location to the corrected laser beam and coupling the first laser into a second optical fiber for delivering the delivery beam to a second remote location; and locking, via a second phase-locked loop, the phase of the delivery beam returning from the second remote location to a phase of the stable laser beam delivered through the stabilized fiber link, thereby delivering the delivery beam to the second remote location free of noise while being transmitted through the second optical fiber.

17. A system for delivering stable laser light to a remote location via an optical fiber, the system comprising:
an optical beam splitter/combiner configured to split a laser beam generated by a first laser into a reference beam and a delivery beam, the delivery beam being coupled into the optical fiber for delivering the delivery beam to the remote location, a fraction of the delivery beam being reflected back from the remote location toward the optical beam splitter/combiner through the optical fiber;
an acousto-optic modulator (AOM) configured to shift a frequency of the reference beam by a predetermined frequency interval, wherein the optical beam splitter/combiner is further configured to combine the reference beam that has been frequency-shifted and the reflected delivery beam to generate an interference beam;
a photodetector configured to detect the interference beam to determine a phase difference between the reference beam and the reflected delivery beam due to noise added to the delivery beam while being transmitted through the optical fiber; and
a phase-locked loop coupled to the first laser and a second laser, the phase-locked loop being configured to adjust a phase of the laser beam generated by the first laser based on the phase difference by locking the phase of the laser beam to a phase of a stable laser beam generated by the second laser, thereby delivering the delivery beam to the remote location free of the noise while being transmitted through the optical fiber.

18. The system of claim 17, further comprising a mirror disposed in an optical path of the reference beam, the mirror configured to reflect the reference beam toward the optical beam splitter/combiner, so as to be combined with the reflected delivery beam.

19. The system of claim 17, wherein at the remote location, the delivery beam is coupled into a second optical fiber for delivering the delivery beam to a second remote location, and the system further comprising:
a second optical beam splitter/combiner;
a second AOM;
a second photodetector; and
a second phase-locked loop;
wherein the second optical beam splitter/combiner, the second AOM, the second photodetector, and the second phase-locked loop are configured to lock a phase of the delivery beam at the second remote location to a phase of a stable laser beam generated by a third laser that is coupled to the second phase-locked loop, thereby delivering the delivery beam to the second remote location free of noise while being transmitted through the second optical fiber.

20. The system of claim 17, wherein the phase-locked loop is further configured to lock a frequency of the laser beam generated by the first laser to a frequency of the stable laser beam generated by the second laser.

* * * * *